United States Patent [19]

Evans et al.

[11] Patent Number: 5,067,129
[45] Date of Patent: Nov. 19, 1991

[54] SERVICE PROCESSOR TESTER

[75] Inventors: Timothy G. Evans, Endicott; Mark W. Gould, Johnson City; Timothy J. McNamara, Endicott, all of N.Y.

[73] Assignee: International Business Machines Corp., Armonk, N.Y.

[21] Appl. No.: 394,696

[22] Filed: Aug. 16, 1989

[51] Int. Cl.$^5$ .............................................. G06F 11/00
[52] U.S. Cl. .................................. 371/16.1; 371/15.1; 371/25.1; 371/67.1
[58] Field of Search ................... 371/16.1, 15.1, 67.1, 371/25.1, 60, 57.1; 364/513, 274.3, 274.5, 275.7

[56] References Cited

U.S. PATENT DOCUMENTS

| 4,464,655 | 8/1984 | Bird | 340/715 |
| 4,488,299 | 12/1984 | Fellhauer et al. | 371/20 |
| 4,550,406 | 10/1985 | Neal | 371/20 |
| 4,606,025 | 8/1986 | Peters et al. | 371/20 |
| 4,622,647 | 11/1986 | Sagnard et al. | 364/580 |
| 4,649,515 | 3/1987 | Thompson et al. | 364/900 |
| 4,654,852 | 3/1987 | Bentley et al. | 371/29.1 |
| 4,727,473 | 2/1988 | Anderson et al. | 364/188 |
| 4,759,019 | 7/1988 | Bentley et al. | 371/3 |
| 4,766,595 | 8/1988 | Gollomp | 371/23 |
| 4,932,021 | 6/1990 | Moody | 364/900 |
| 4,970,725 | 11/1990 | McEnroe et al. | 371/15.1 |

FOREIGN PATENT DOCUMENTS 1479122 7/1977 United Kingdom .
1510240 5/1978 United Kingdom .

OTHER PUBLICATIONS

IEEE Potentials, Oct. 1986, "Fault Diagnosis", by Thomas J. Laffey.
IEEE, Jun. 1987, "A PC Based Expert Diagnostic Tool", by Paul M. Bursch et al.
IEEE, Oct. 1988, "A Knowledge-Based System for Selecting Test Methodologies", by Xi-An Zhu et al.
Test Case Generator Tutorial, by C. U. Munoz. (Technical Report)
A Test Program Generator for Testing Compilers of PL/1-Like Languages, by D. L. Bird, D. G. Jacobs, T. Clowes, R. E. Weir.
IBM TDB, Feb. 1986, pp. 3726-3727, "Automated Testing of Application Programs".
IEEE Article vol. SE-10, No. 4, Jul. 1984, "An Evaluation of Random Testing".
IEEE Article, Vol. SE-12, No. 1, Jan. 1986, "Certifying The Reliability of Software".

(List continued on next page.)

Primary Examiner—Jerry Smith
Assistant Examiner—Ly V. Hua
Attorney, Agent, or Firm—Arthur J. Samodovitz

[57] ABSTRACT

An apparatus automatically generates test programs to test a service processor associated with a computer. The apparatus comprises a knowledge base for mapping screens generated by the service processor, which screens are arranged in a hierarchical manner and comprise menu screens which access other screens lower in the hierarchy and end point screens which represent memory of the computer serviced by the service processor. The apparatus also includes a user interface for selecting at least one screen generated by the service processor, which screen identifies a branch of screens lower in the hierarchy for testing. A program generator is coupled to the user interface and the knowledge base, and identifies from the knowledge base the screens in the branch. The program generator also generates a program to direct the service processor to call up the screens in the branch, and test the pathing between the screens by comparing the map provided by the memory to the screens actually called up by the service processor. To reduce the testing time, the program generator can select a fraction of the paths in the branch for testing. The program generator also writes a program to direct the service processor to exercise the end point screens to determine if the service processor is able to write data into the memory of the computer.

17 Claims, 8 Drawing Sheets

OTHER PUBLICATIONS

"A Sentence Generator for Testing Parsers", by Paul Purdom.

IBM TDB, Oct. 1982, pp. 2304-2305, "Screen Image Rule Generation System for Test Data ...".

IBM TDB, Oct. 1982, pp. 2316∝2318, "Engineering Data Entry System for Automatic Generation of ...".

IBM TDB, Dec. 1985, p. 3213, "Diagnostic Expert System Rulebase Loop Handling".

IBM TDB, Mar. 1988, pp. 314-316, "Expert System to Ease Repair of Printed Circuit Boards".

IBM TDB, May 1979, pp. 4861-4863, "Technology/Tester Independent Query Syntax for the Interactive ...".

IEE Article, "An Approach to Software Product Testing".

Pracniques, Feb. 1983, vol. 26, No. 2, "Monte Carlo Debugging: A Brief Tutorial".

Software Practice and Experience, vol. 10, pp. 897-918, "Compiler Testing Using a Sentence Generator".

Software-Practice and Experience, vol. 12, pp. 505-516, "A Test Data Synthesizer for Telephone Company Accounting Office ...".

IBM Systems Journal, vol. 22, No. 3, 1983, "Automatic Generation of Random Self-Checking Test Cases".

"Automatic Generation of Test Cases", by K. V. Hanford.

"Testing Compilers of High Level Programming Languages", by R. P. Seaman.

"Using Attributed Grammars to Test Designs and Implementations", by A. G. Duncan & J. S. Hutchison.

"Requirements-Based Testing of Real-Time Systems: Modeling for Testability", by M. Chandrasekharar, B. Dasarathy & Z. Kishimoto.

"Limits to Program Testing with Random Number Inputs", by Paul B. Moranda.

"Quantifying Software Validity by Sampling", by J. W. Duran & J. J. Wiorkowski.

"Misconceptions and Fallacies in Software Reliability", by Harlan D. Mills.

SERVICE PROCESSOR TESTER

BACKGROUND OF THE INVENTION

The invention relates generally to computer test equipment and deals more particularly with a computer tool for automatically generating test cases to test a service processor associated with another computer.

Many computers are equipped with a service or support processor which is used to assist a person in verifying that the computer is working properly, or debugging the computer. A service processor can provide a variety of functions. Some service processors are capable of writing into computer memory and then reading the contents of the memory to determine if the memory is working properly. Also, some service processors can load an initial program, load initial microcode, verify that memory has been allocated for an application, and identify communication channels which are operable. Also, some service processors can correct certain failures and reset certain functions to perform the correction.

A previously known IBM (registered trademark of IBM Corp.) service processor is resident in a personal computer and used with an IBM 9370 computer to provide such functions. This service processor displays initial and intermediate menu screens, and end point screens which are manually selected using the menu screens in a pathing manner. Each end point screen represents a function performed by the service processor, for example, accessing (reading/writing) a location in computer memory, initial microcode loading (IML), initial program loading (IPL), memory configuration, etc.

Heretofore, the testing of this service processor was done manually or semi-automatically. To test the service processor manually, a person would first utilize the menu screens manually to verify the pathing function of the service processor. Next, the person, upon reaching an end point screen representing a certain location in memory, would (a) direct the service processor to write into the location in memory referenced by a cursor on the screen, and (b) subsequently attempt to read the contents of that location in memory with the aid of the service processor to verify that the service processor and that location in memory are working properly (i.e. exercise the end point screens). Other end point screens representing different functions such as the IML or IPL, are tested in the same manner.

To test the service processor semi-automatically, a person would first write an individual test program in which the person specified a command for each screen to direct the service processor to sequentially call-up each screen in the path. The program also includes commands for each menu screen to determine if the pathing function of the menu screens is working properly. The program also contains steps to exercise end point screens.

However, despite the level of automation provided by the use of test programs, the previously known process for testing the service processor is still time consuming because the person must specify each and every screen in the path and each and every end point screen for testing; there can be hundreds of end point screens associated with such a service processor that require exercise, and many more menu screens that require the pathing test.

Accordingly, a general object of the present invention is to provide a fully automatic tester for testing menu and end point or function screens of the foregoing and other service processors.

A more specific object of the present invention is to provide a test case generator which is readily adaptable to a variety of service processors and the screens associated therewith.

Another specific object of the present invention is to provide a test tool of the foregoing type which can be programmed to sample test from a selected group of screens to minimize the requisite testing time.

Another specific object of the present invention is to provide such a test tool which can also be used to test general purpose menu screens, and associated end point screens.

SUMMARY OF THE INVENTION

The invention resides in an apparatus for automatically generating test cases to test a service processor associated with a computer. The apparatus comprises a memory or knowledge base for storing a map indicating a correct hierarchical arrangement of screens, which screens are stored by the computer. The screens comprise menu screens which access other screens lower in the hierarchy and end point screens which represent memory of the computer serviced by the service processor. The apparatus also includes a user interface for selecting at least one screen generated by the service processor, which screen identifies a group of screens in one or more paths for testing. A program generator is coupled to the user interface and the knowledge base, and identifies from the memory, screens in the group. The program generator also generates a program to direct the service processor to call up screens of the group, and test the pathing between the screens of the group by comparing the expectations of the test program to the screens actually called up by the service processor.

According to one feature of the invention, the group is contained in a branch of screens of the hierarchy, and the program generator can select a fraction less than the total number of paths of the paths in the branch for testing.

According to another feature of the invention, random tests can be sequentially generated and run until the program is halted.

The program also selects end point screens in the group for testing. The program directs the service processor to exercise the end point screens by entering valid data and subsequently verifying that the data was indeed entered, or attempting to enter invalid data and looking for an error message. According to another feature of the invention, the program generator can select all or less than all of the fields within the end point screens. Then, the program generator generates a program to test the ability of the service processor to write data into these fields in the computer and read from appropriate output fields.

According to another feature of the invention, the program generator can exercise a greater fraction of boundary values of fields than interior values of the fields. This feature is useful because many errors occur at the boundaries.

DETAILED DESCRIPTION OF THE PREFERRED EMBODIMENTS OF THE INVENTION

Figure 1:
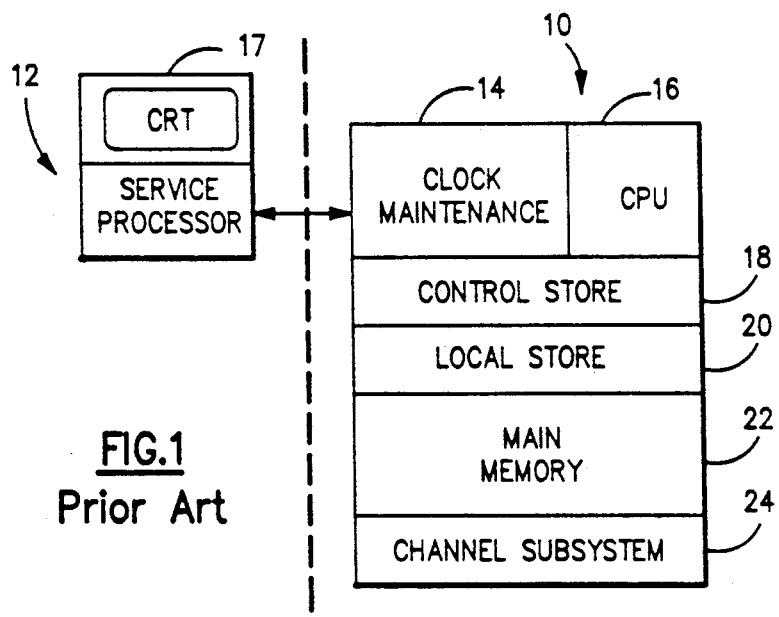
FIG. 1 is a schematic block diagram illustrating a computer and a service processor according to the prior art.

Referring now to the drawings in detail wherein like reference numerals indicate like elements throughout the several views, FIG. 1 illustrates selected components of a medium sized computer generally designated 10, and a service processor generally designated 12 according to the prior art By way of example, computer 10 is an IBM 9370 computer and includes clock maintenance 14, CPU 16, control storage memory 18, local storage memory 20, main memory 22, and a channel sub-system 24. Such components of the IBM 9370 computer and service processor 12 are described in more detail in IBM System/370 "Principles of Operation" manual order no. GA22-7000 published in 1981 by IBM Corporation of Armonk, NY, and IBM System/370 "Principles of Operation" manual order no. GA22-7200 published in 1987 by IBM Corporation of Armonk, NY. These two publications are hereby incorporated by reference as part of the present disclosure.

By way of example, service processor 12 is a personal computer which includes a CRT 17, and interacts with each of the foregoing components of computer 10 via clock maintenance 14.

Figure 2:
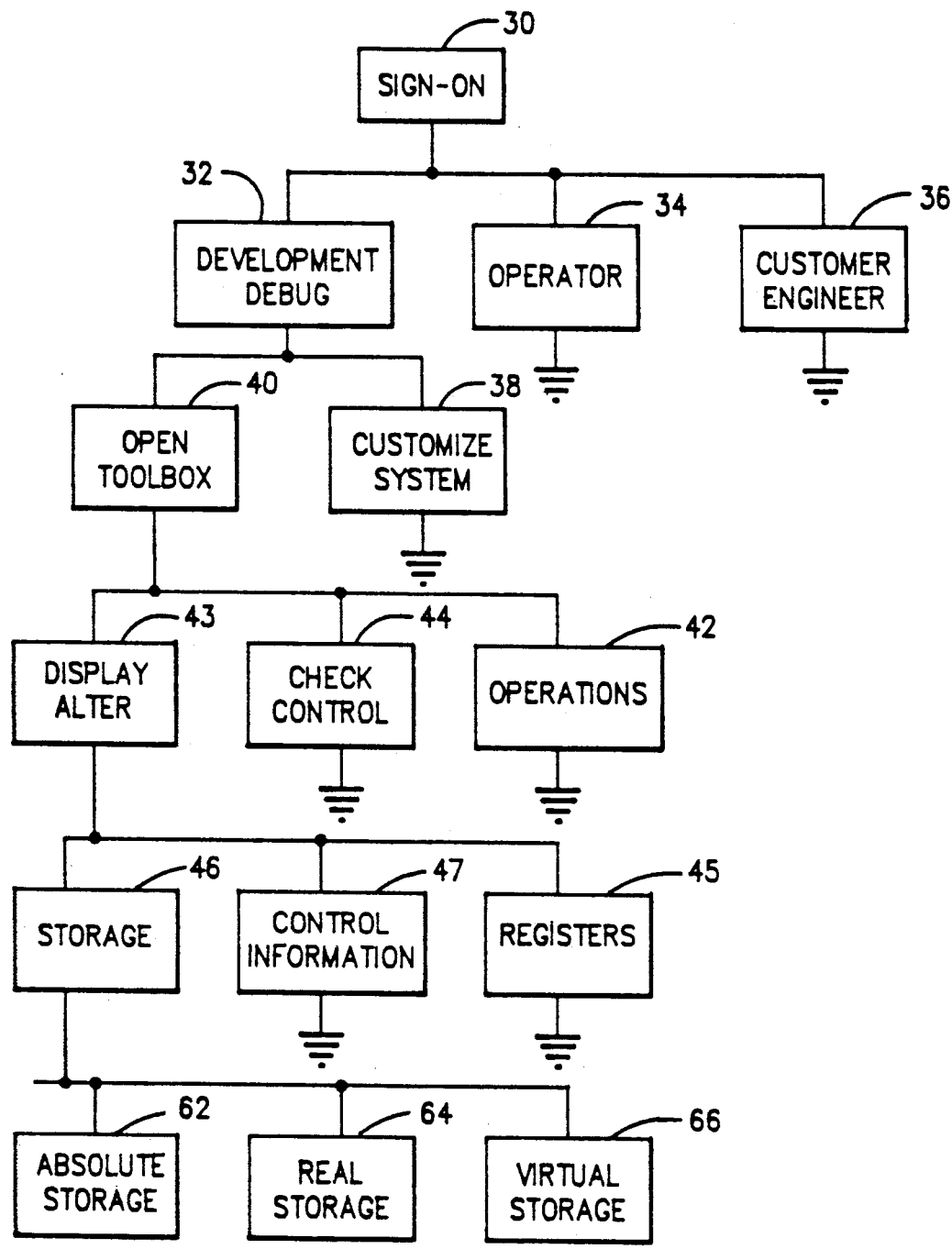
FIG. 2 is a schematic diagram illustrating a hierarchy of menu and end point computer screens displayed by the service processor of FIG. 1.

FIG. 2 illustrates in fragmented form an exemplary hierarchy of menu and end point screens generated by service processor 12, but not found in the IBM 370 service processor, to enable a person to window and control computer 10. When service processor 12 is activated, the service processor initially generates a "Sign-on" Screen 30 which Sign-on Screen is used as a menu to select one intermediate menu screen, Development Debug screen 32, Operator Screen 34, or Customer Engineer screen 36. Such intermediate screens define three general service processor functions. FIG. 2 also illustrates the menu screens stemming from Development Debug screen 32 i.e. Customized System screen 38 and Open Toolbox screen 40. Other intermediate menu screens 42–47 and end point screens 62, 64, and 66 stem from Open Toolbox screen 40. Absolute Storage screen 62, Real Storage screen 64, and Virtual Storage screen 66 all represent portions of memory 22, but provide different modes of display.

Figure 3:
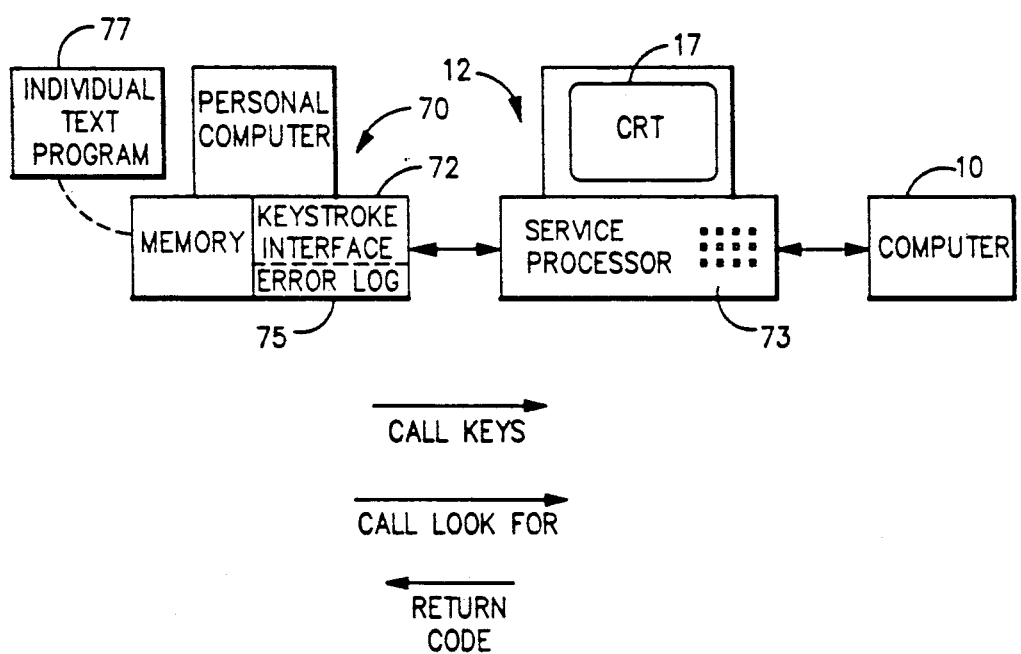
FIG. 3 is a block diagram illustrating a semi-automatic test apparatus according to the prior art for testing the service processor of FIG. 1.

FIG. 3 is a block diagram of a prior art, semi-automatic system for testing service processor 12. According to the prior art, a person would first write an individual test program 77 in which the person specified a command for each screen to direct the service processor to sequentially call-up each screen in a path. The program is subsequently loaded and run in a test system 70 which comprises a personal computer. The screens actually called-up are verified through additional code in the test program to determine if the pathing function of the menu screens is working properly. The program also contains steps to exercise end point screens. For example, if the end point screen represents a portion of memory, then test system 70 is used to run a program to direct service processor 12 to write data into the memory. The program transmits via a keystroke interface 72 information to manipulate a cursor on monitor 17 and thereby indicate a precise location in memory. Then, the program transmits a write request to service processor 12 via keystroke interface 72. The keystroke interface 72 generates the same input to service processor 12 as a keystroke on keyboard 73. The following is a more specific listing of these steps:

The cursor manipulation step in the program is as follows:

CUR_MOVE (ROW X, COLUMN Y).

This step causes the keystroke interface to stimulate repeated activation of a cursor tab key until the cursor is positioned at the specified row and column. The following step in the program specifies the write request and the data to be written into the location indicated by the cursor:

CALL_KEYS (DATA).

In response, the service processor updates the next row, same column position on the screen with the data actually written. This position is tied to the previous row and column, and used to display the contents of the previous row. The program step is as follows:

CALL_LOOK_FOR (ROW+1, COLUMN, DATA).

This program step also directs service processor 12 to compare the actual data written during the "CALL KEYS" step to the "data" requested to be written. Service processor 12 generates a return code indicating whether the two are the same. Next, the program reads the return code:

CHECK_RETURN_CODE.

If the two are the same, the return code equals zero and the service processor is deemed to be working properly. However, if the two are not the same, the return code does not equal zero, either service processor 12 is not working properly or memory 22 is not working properly, and an error message is written into error log 75, and an error recovery process is invoked.

Even though test system 70 and individual test program 77 facilitate the testing of service processor 12, the overall test process is protracted because there are very many screens in the hierarchy, the user must specify each menu and end point screen to be tested, and the user must write the code for each test.

Figure 4:
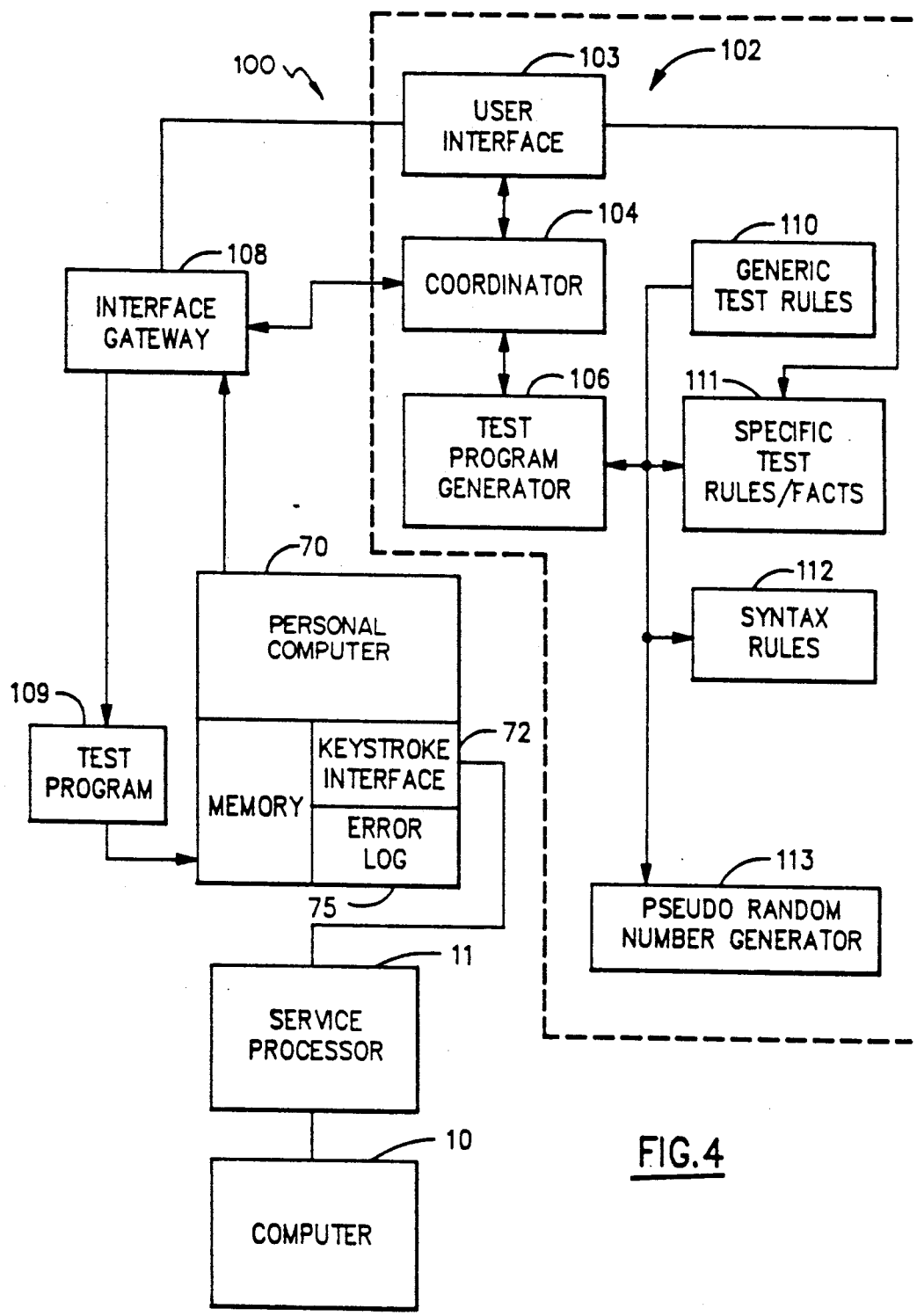
FIG. 4 is a block diagram illustrating an automatic service processor tester according to the present invention. The automatic tester comprises a novel test program or test case generation system in combination with the semi-automatic tester (exclusive of the individual test program), service processor, interface gateway, and computer of FIG. 3.

Focusing now on the present invention, FIG. 4 illustrates a fully automated test system generally designated 100. System 100 comprises a novel test program or test case generation system 102 embodying the present invention, semi-automatic test system 70 (exclusive of individual test program 77), and a prior art gateway routing interface 108 therebetween. System 102 includes a user interface 103, a coordinator 104 and a test program or test case generator 106. As described in more detail below, test program generator 106 is a knowledge base system which automatically generates a test program 109 off-line to test the pathing function of the menu screens and exercise the end point screens of the service processor. Later, the program is loaded into system 70 and run, and all desired test cases are run without further manual input.

Figure 5:
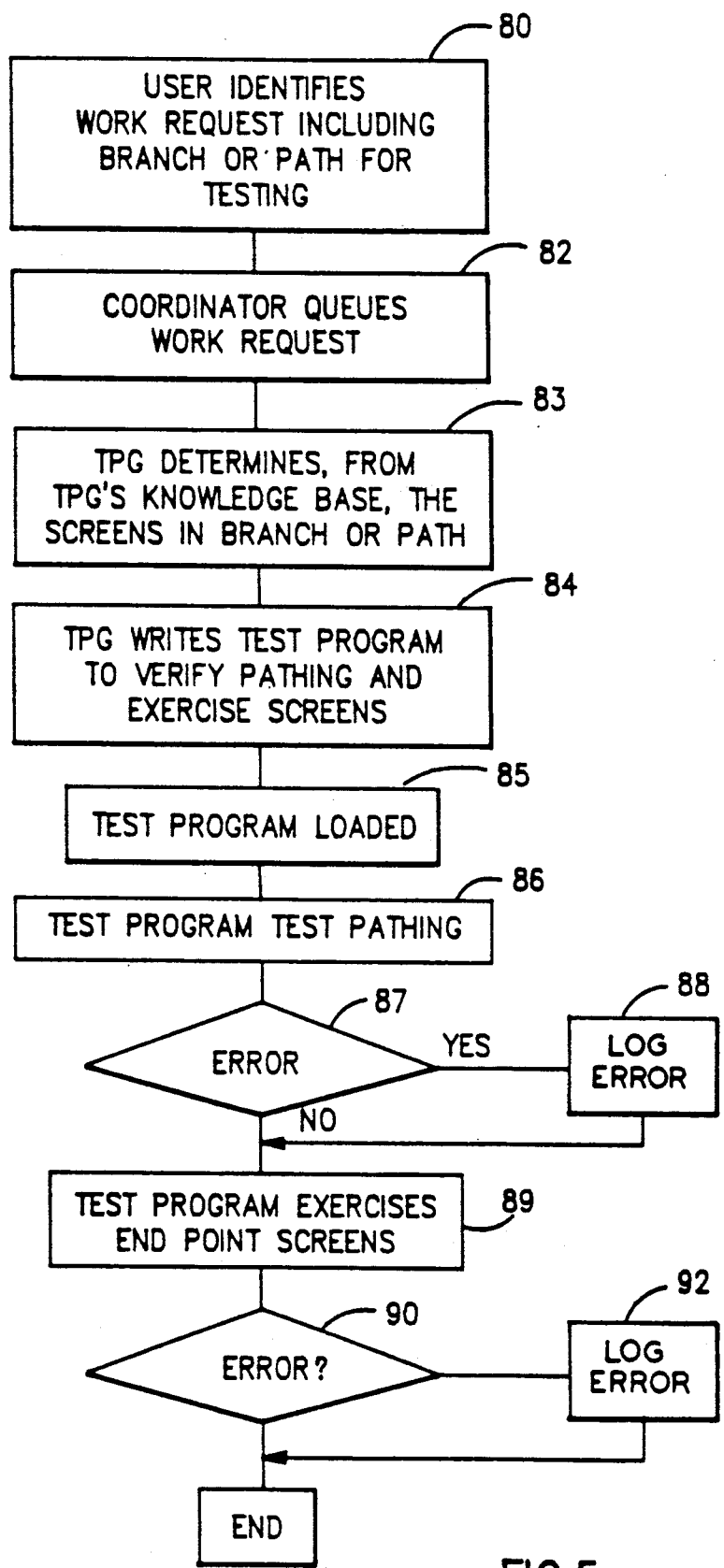
FIG. 5 is a flowchart illustrating the general operation of the automatic service processor test case generator of FIG. 4 and subsequent execution of the test program.

FIG. 5 is a flowchart which illustrates the basic mode of operation of system 100. In step 80, a user specifies by the hierarchy of screens of FIG. 2, the highest screen in a branch of screens for testing, or starting and ending screens in a test path. When test program generator 106 is available, coordinator 104 transmits the work request of step 80 to generator 106 (step 82) so that generator 106 can write a corresponding test program 109. Then test program generator 106 determines from its knowledge base the screens in the branch or path (step 83) beginning with the starting screen designated in step 80. Next, the test program generator writes test program 109 to (a) verify that service processor 12 can actually access each or a sampling of screens in the branch or path by the appropriate menu screens actually generated by service processor 12 and (b) exercise the end point screens (step 84). Next, test program 109 is loaded into system 70 (step 85) and run to test the pathing actually provided by service processor 12 (step 86). Any errors are logged (steps 87 and 88) into log 75 and an error recovery process is invoked. Next, the test program exercises end point screens in the branch or path to determine whether service processor 12 can in fact perform the function represented by this screen (step 89). Such functions include the writing into and reading from memory by service processor 12, the allocation of memory by service processor 12 for an application and the ability of service processor 12 to power up CPU 16. Any errors are logged (steps 90 and 92) into log 75 and an error recovery process is involved.

USER INTERFACE

Figure 6:
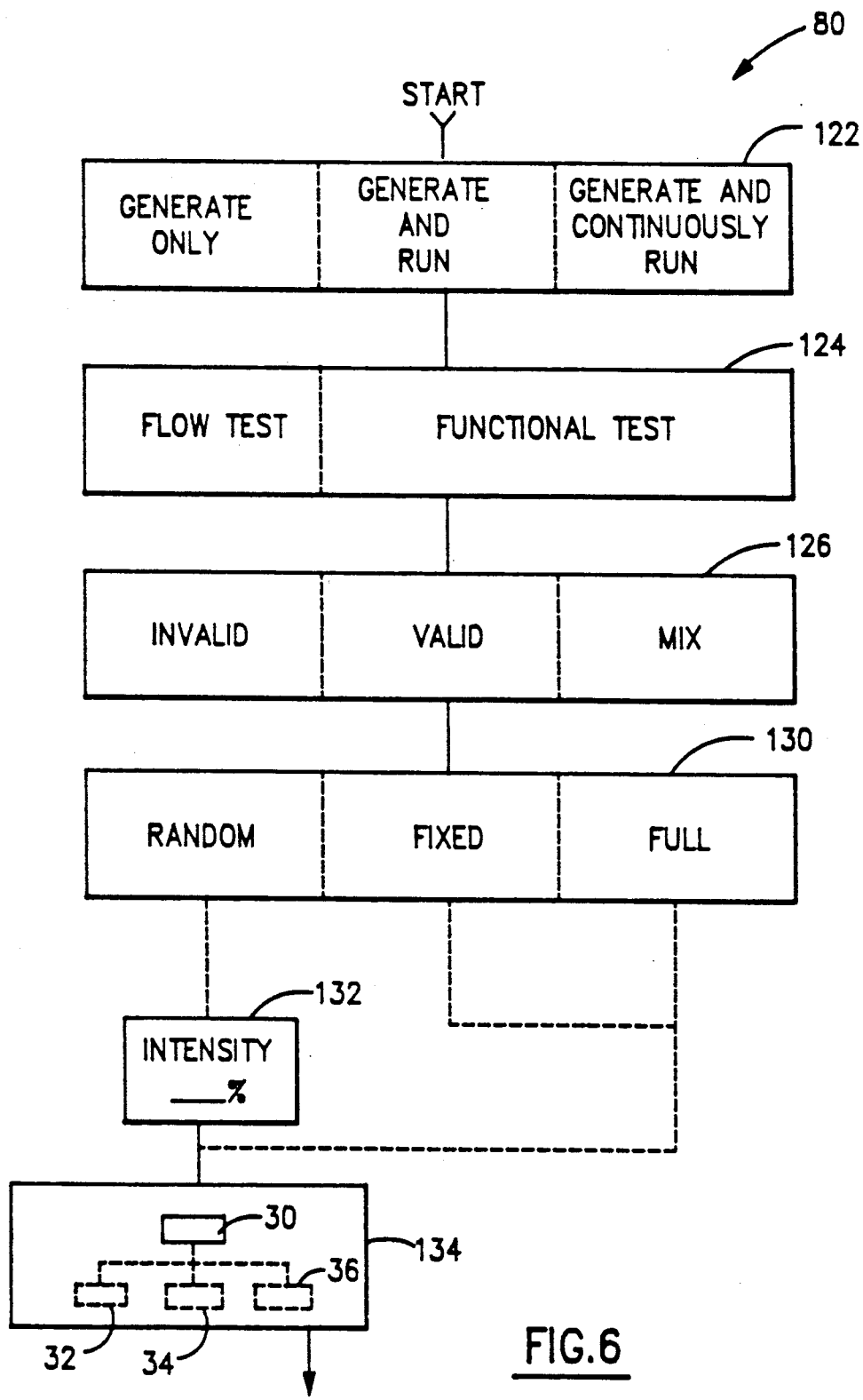
FIG. 6 is a diagram illustrating user interface menus for initiating the test program generation system of FIG. 4.

User interface 103 displays screens indicated by FIG. 6 which screens allow the user to specify a work request (step 80 of FIG. 5). Screen 122 allows the user to select any one of three test modes - "generate only", "generate and run", and "generate and continuously run". The "generate only" test mode directs the test program generator to write test program 109 but not to have it run by system 70. The "generate and run" mode directs the test program generator to write the test program and also to have it run. The "generate and continuously run" mode directs the test program generator (via a work request provided by coordinator 104 which is described in more detail below) to write a test program to randomly test some paths and end point screens in a branch. However, after this test is run, the program directs system 70 to notify coordinator 104. In response, coordinator 104 directs test program generator 106 to generate another test program to randomly test some paths and end point screens in the same branch. This process is repeated until either a manual shut off or a predetermined time-out. This last mode can be used in situations where the number of test screens is very large and the user has a limited time to run the test program but does not know the maximum intensity factor to fill that time.

A next screen 124 will direct the generator 106 into the "flow test" mode to write the test program to check the pathing between screens but not to exercise the end point screens, or into the "functional" mode to write the test program to check the pathing and exercise the end point screens.

If the "functional" or "flow" mode is selected from screen 124, then the user interface presents screen 126 in which "INVALID", "VALID", or "MIX" options are presented. The "INVALID" option yields a test program which attempts to process invalid data with service processor 12. For example, after selection of the "INVALID" option, test program 107 will attempt to write a value out of range into a field, try to enter the wrong type of data such as a character instead of a number into a numeric field, strike an invalid PF key, or make an invalid selection. The "VALID" option yields a test program which attempts to write the proper type of data into a field and subsequently determine if the data has in fact been written into the field as noted above. The "MIX" option yields a test program which makes both types of test, "INVALID" data and "VALID" data.

After screen 126 has been utilized, user interface 103 presents screen 130 which displays "random", "fixed", and "full" options. The "fixed" option allows the user to designate a starting screen such as Screen A, and one or more end screens, such as Screen B described below, and directs the test program generator 106 to test the screens in the paths between Screen A and any designated Screen B. The "full" option allows the user to provide a starting screen of a branch and directs the test program generator 106 to write a test program to test all paths beneath the designated screen in the tree hierarchy. The "random" option calls up screen 132 in which the user enters the desired "intensity" of the random testing. This user entry is in the form of a percentage and indicates the percentage of paths and screens within the test branch or path which the user would like the test program to test. The user also has the option to specify a seed for recreation of a given set of test programs. One will be chosen randomly if not provided. After interface 103 presents screen 132 or after the "fixed" or "full" options are selected from screen 130, screen 134 is presented in which the first screen 30 of the hierarchy of FIG. 2 is displayed. In the illustrated example, the user then has the opportunity to select one of the screens 32, 34, or 36 accessed by screen 30 as a starting point for the testing. If the user wants to start the testing lower than the selected screen 32, 34, or 36 in the hierarchy to reduce the testing time, the user can then select one of the screens accessed by the selected screen 32, 34, or 36. In response, user interface 103 will present the selected screen, and allow the user to designate anyone of the screens accessed by it as a starting point in the testing. This procedure is repeated until the user makes a selection to initiate the testing. When the selection is made, user interface 103 writes all selection numbers to a file (as described below).

User interface 103 also permits the user to make additional screen selections below the first selection in the "Fixed" mode to limit the paths under test to those containing all the selected screens. These paths also define the end point screens to exercise. User interface 103 also stores the selection number(s) of the additional screens in the file. After all the selections are made, the file is sent to test program generator 106 via coordinator 104 to determine all the paths beneath the starting screen (and including the other screen(s) if selected) and pseudo randomly select some of the paths (if random test) for testing as described below.

COORDINATOR

Figure 7:
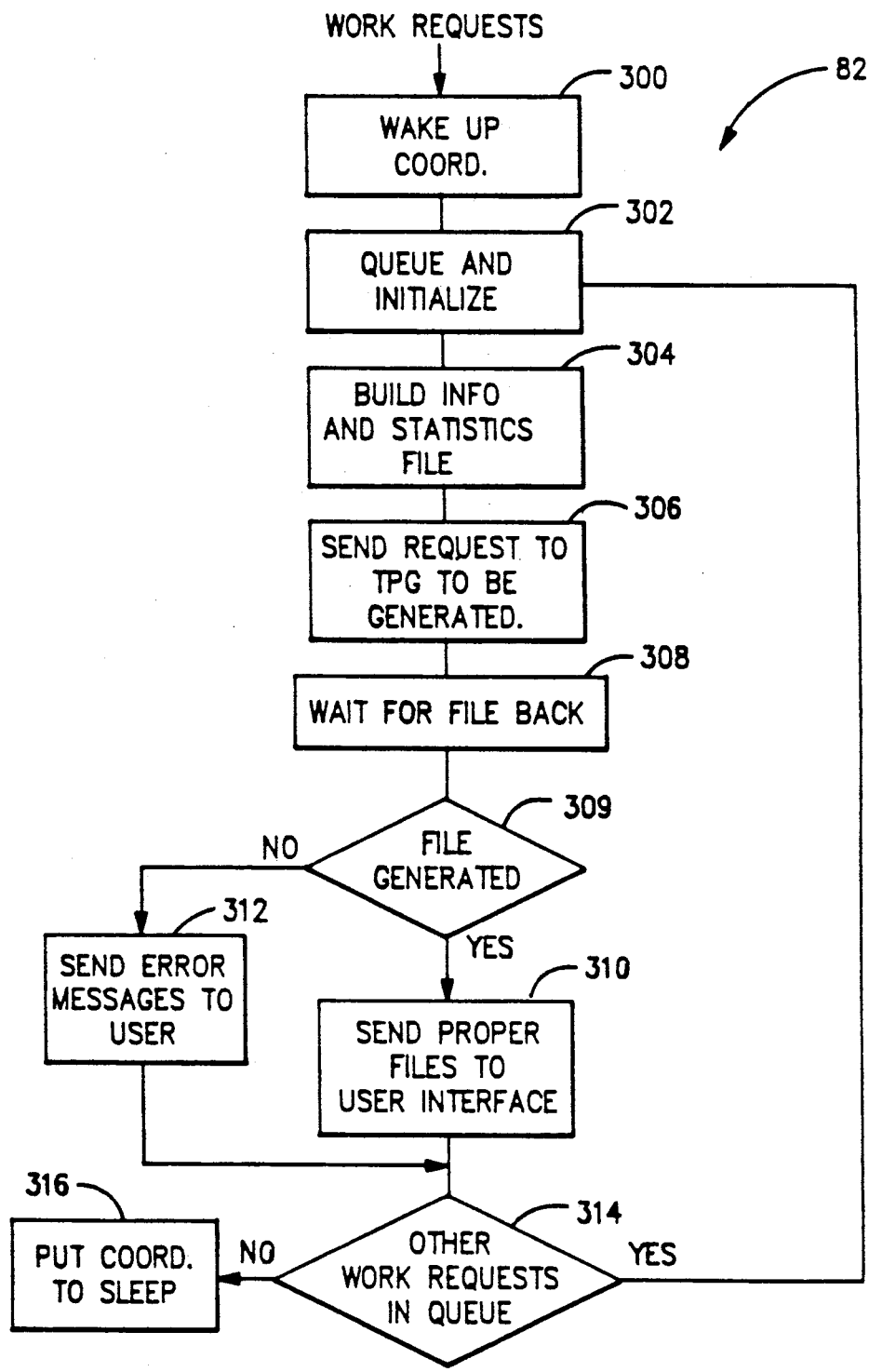
FIG. 7 is a flowchart illustrating the operation of a coordinator with the test program generation system of FIG. 4.

In the illustrated embodiment, many users can have access to system 102. As illustrated in FIG. 7, coordinator 104 receives one or more work requests in a file(s) from user(s) via user interface 103, the first of which work requests "wakes-up" the coordinator (step 300). The work request file includes the selection number(s) which indicates the starting screen (and optionally additional screens in the test paths) to define the path tests and end point screens described above. Next, coordinator 104 names and queues the work requests (step 302). Then, coordinator 104 formats the work request for future reference by a user (step 304). For continuously run tests, coordinator 104 also keeps statistics indicating the paths that are slated for testing and how many times each path will be tested for different tests. Such statistics allow the user to decide if there will be sufficient tests for each path, and whether additional testing is needed. The statistics also indicate how many test cases will be run for each end-point screen.

The work request which is first in line is sent to test program generator 106 for execution (step 306). Coordinator 104 then waits for the results from the Test Program Generator (step 308). If the work request is executed successfully (decision block 309), then a complete file is sent to the user including the test cases (step 310). If there is an error in the work request or some other problem arises, an error signal is transmitted to the user (step 312). After step 310 or 312, coordinator 104 determines if there are other work requests in the queue (decision block 314). If so, control returns to step 302. If not, the coordinator is put to sleep again (step 316). The actual pathing and exercise test program is generated and run after step 308. As illustrated in FIG. 4, any errors logged in log 75 are reported directly to the user interface 103 via interface gateway 108 and communication line 320.

TEST PROGRAM GENERATOR

Test Program Generator 106 is a rule-oriented knowledge base system, and by way of example, utilizes VM/PROLOG language and its built-in inference engine. Generator 106 includes rules/facts to chain and analyze the rules/facts to arrive at an appropriate test procedure. In addition, generator 106 can also read from a file, write to a file, change the format of numbers and provide an interface to other computer languages. The knowledge base of generator 106 includes Specific Test rules/facts 111 which are used to define (including menu function) all of the screens generated by service processor 12 including Sign-on menu screen 30, Intermediate menu screens 32-47, and end point screens 62-66 as illustrated in FIG. 2. For each menu screen, there are at least as many Specific Test rules/facts as the number of screens which are accessed by this screen. In the example illustrated in FIG. 2, Sign-on screen 30 can be used to access Development Debug screen 32, Operator screen 34, and Customer Engineer screen 36. Consequently, there are Specific Test rules/facts which indicate that Sign-on screen 30 leads to each of the other screens 32, 34 and 36. System 100 uses the following PROLOG format to indicate these relationships:

1. PANEL_DEF ("SIGN-ON", "DEVELOPMENT DEBUG", 1, D, "DEVELOPMENT DEBUG").
2. PANEL_DEF ("SIGN-ON", "OPERATOR INTERFACE", 2, 0, "OPERATOR").
3. PANEL_DEF ("SIGN-ON", "CUSTOMER INTERFACE", 3, C, "CUSTOMER ENGINEER").

In the foregoing PROLOG format, each of the three rules/facts is a definition of the Sign-on panel or screen 30. In each of the foregoing rules/facts, the term which follows "Sign-on" is a description of another screen or panel which is accessed by the menu of Sign-on screen 30. The number following the screen description term is the selection number (noted above) which identifies the accessed screen, and the letter following the selection number is a keyboard 73 entry to select the accessed screen. The last term in each of the rules/facts is the actual title of the accessed screen. The description in the panel definition may or may not be the same as the actual title. The knowledge base includes analogous rules/facts for all of the screens displayed by service processor 12. For example, the following are the rules/facts for the Development Debug screen 32:

1. PANEL_DEF ("DEVELOPMENT DEBUG", "CUSTOMIZE SYSTEM", 4, C, "CUSTOMIZE SYSTEM").
2. PANEL_DEF ("DEVELOPMENT DEBUG", "TOOL LIST", 5, O, "OPEN TOOL BOX").

Such rules/facts define the hierarchical tree illustrated in FIG. 2 including all of the screens that can be generated by service processor 12, and the pathing between all of the screens.

Test program generator 106 also includes other Specific Test rules/facts which define all the end point screens including screens 62, 64 and 66 which correspond to the functions in computer 10. For example, in FIG. 2, Real Storage screen 64 corresponds to memory 22 and is defined in part by the following rules:

1. VAR_TYPE ("REAL STORAGE", VAR 1, "HEX");
2. VAR_RANGE ("REAL STORAGE", VAR 1, [O,FFFF]);
3. VAR_POS ("REAL STORAGE", VAR 1, 11, 20); and
4. VAR_OPT ("REAL STORAGE", VAR 1, W).

In the Real Storage screen 64, rule/fact number 1 above identifies a field as "VAR 1" and states that the "VAR 1" field contains hexadecimal data. Rule/fact 2 specifies that the "VAR 1" field can accommodate hexadecimal entries in the range 0-FFFF. Rule/fact 3 states that the VAR 1 field is positioned in Row 11 Column 20 of the screen 64. Rule/fact 4 specifies that the "VAR 1" field is a write ("W") field, i.e. data can be written into the VAR 1 field. There are other rules/facts that define all other write fields in screen 64, and screen 64 can comprise several pages.

The test program generator 106 also includes other Specific Test rules/facts which identify and describe read fields in the Real Storage screen 64. For example, another set of four rules/facts describes the "VAR 2" field, which field is used to determine if data that was intended to be written into the "VAR 1" field was actually written into memory:

1. VAR_TYPE ("REAL STORAGE", VAR 2, "HEX");
2. VAR_RANGE ("REAL STORAGE", VAR 2, [O,FFFF]);
3. VAR_POS ("REAL STORAGE", VAR 2, 12, 20); and
4. VAR OPT ("REAL STORAGE", VAR 2, R).

Rule/fact 1 indicates that the VAR 2 field includes hexadecimal data. Rule/fact 2 indicates that the range of the VAR 2 field is 0-FFFF. Rule 3 indicates that the "VAR 2" field is located at row 12, column 20, immediately below the "VAR 1" field so that both fields can be viewed simultaneously on monitor 17 for comparison purposes. The service processor is programmed to tie both of these fields to the same location in memory because the fields are located in successive rows (odd, even) in the same column. The service processor is also programmed to respond to row 11 as a write field and row 12 as a read field for the same reason. Rule 4 indicates that the "VAR 2" field is a read field ("R").

There are other rules/facts that define other read fields in screen 64. The other end point screens which are used to allocate memory or power up/down include write and read fields and rules/facts which are analogous to those listed above.

All the foregoing Specific Test rules/facts describe the pathing between screens and the format of end point screens of service processor 12 in a manner which permits fully automatic testing as described in more detail below. The information for the Panel Definitions and Field Definitions can either be input manually, or preferably extracted directly (electronically) from a data base used to program the service processor.

Test program generator 106 also includes Generic Test rules 110 which fall into two general categories, Utility rules and Interpretative rules. Utility rules assist in the writing of the test program to a file by providing a shorthand interface to the file. For example, a Utility rule can be used to state that the command "OPEN FILE" is a shorthand substitute for the corresponding detailed PROLOG commands. Similarly, a Utility rule can be used to state that the command "WRITE INTO FILE" is a substitute for the corresponding detailed PROLOG commands. Another example of a Utility rule is a rule to generate pseudo random numbers i.e. to generate a random number based on a seed. As described in more detail below, the pseudo random numbers are used to test some but not all of the paths in a branch and the screens within each test path to reduce the time required to make the test. Another type of Utility Rule is a rule to define the conversion from a hexadecimal number to a decimal number. This rule is included to permit system 100 to interface to service processors which operate with either hexadecimal code or decimal code.

The Interpretative rules are used to determine paths to test and generate tests to exercise these paths. For example, the following Interpretative rules are used recursively to test the pathing between two specified screens A and B in the fixed test mode:

1. IF ARC (SCREEN A, SCREEN B), THEN PATH (SCREEN A, SCREEN B)
2. IF ARC (SCREEN A, SCREEN INT) AND PATH (SCREEN INT, SCREEN B), THEN PATH (SCREEN A, SCREEN B)

An "ARC" is a direct connection between two screens without any intermediate screens, and a "path" is a connection with or without intermediate screens. If either rule 1 or rule 2 is satisfied, then there is a "path" between the two screens. Rules 1 and 2 are recursively applied until a direct connection is found from an Intermediate screen to Screen B. Then generator 106 updates and identifies the record for this path. It should be noted that at this time, generator 106 has only identified and verified the pathing within the knowledge base of generator 106. In the example illustrated in FIG. 2, Screen A could be Screen 32 and Screen B could be Screen 64, at the discretion of the user. Rule 1 is translated to mean that if there is an ARC from Screen A to Screen B then there is a path from Screen A to Screen B. Rule 2 is translated to mean that if there is an ARC from Screen A to an intermediate screen, and a path from the Intermediate screen to Screen B, then there is a path from Screen A to Screen B.

The test program generator 106 tests rule 1 by reading all the panel definition rules/facts described above for Screen A to determine if there is a direct path or ARC from Screen A to Screen B. This step is implemented by reading the last entry for the panel definition rules/facts for Screen A. If this rule is satisfied, then generator 106 has located the path within the knowledge base of the generator 106. If this rule is not satisfied, then the generator tests Rule 2. To test Rule 2, the generator substitutes for Screen INT, one of the screens accessed by Screen A. This information is obtained from the panel definition rules/facts described above. Next, generator 106 analyzes the second premise of Rule 2 by resort to Rule 1 i.e. there is a path from Screen Intermediate to Screen B if there is a direct connection therebetween. This information is obtained from the panel definition rules/facts for Panel Intermediate. After both premises of Rule 2 are tested and Intermediate panels are defined by the panel definition rules/facts for Screen A, generator 106 records the path tested. At this time, the record for the path comprises the selection number for Screen A and the keystroke letter for the first screen accessed by Screen A. For example, after the first iteration of steps 1,2 described above, the following record is made for the path from Screen 30 to screen 32: 1, d.

Assuming that Rule 2 was not satisfied during the first iteration, then one of the screens accessed by screen 32 becomes the new Intermediate panel. According to the panel definitions for screen 32, the new Intermediate panel is screen 38. The existence of this screen satisfies the first premise of Rule 2. Then, the second premise of Rule 2 is tested by determining if there is any connection from the new Intermediate panel to Screen B. This information is obtained from the panel definitions for screen 38. Next, generator 106 updates the record of the path under test: 1, d, c. This process is repeated until this path leads to Screen B. In the former case, test program generator 106 incorporates in the test program 107 the keystroke letters of the valid path from Screen A to Screen B as well as the screen title for each screen. A panel definition for each end point screen differs from the panel definitions for the intermediate screens because the end point screens do not identify any lower screens:

PANEL_DEF ("ABSOLUTE STORAGE", *, *, 'ENTER', "ABSOLUTE STORAGE").

When generator 106 reads the "enter" entry, generator realizes that the Absolute Storage screen is an end point screen, and concludes the path. If the end point screen is not Screen B, test program generator 106 backs-up one level from the end point screen and then redefines the path to include a different one of the screens accessed by the one-level up screen, for example, if the first path lead to Absolute Storage screen 62, and screen 62 was not Screen B, then generator 106 would back-up to Storage screen 46 and define a new path to Real Storage screen 64. If Real Storage screen 64 is not Screen B, then generator 106 again backs-up to Storage screen 46 and defines a new path to Virtual Storage screen 66. If Virtual Storage screen 66 is not Screen B, then generator 106 backs-up one more level to Display Alter screen 43 and defines a new path to Control Information screen 47. The foregoing process is repeated until Screen B is located and the path identified by selection number for Screen A and keystroke letters leading from Screen A to Screen B.

When the work request is to test a branch of screens emanating from a single starting screen, generator 106 first determines all end point screens in the branch and then maps each path stemming from the starting screen to all (full test) or some (random test) of the end point screens in the branch. All the end point screens in the branch are determined as follows: Rules 1 and 2 above are utilized to identify a candidate screen in the branch, which candidate screen may or may not be an end point screen. To utilize Rules 1 and 2 for this purpose, the starting screen is substituted for Screen A and Screen B is identified as a candidate screen by Rules 1 and 2 and the knowledge base of panel definitions. Then, the following Rule 3 is analyzed to determine if the candidate screen is an end point screen:

3. If path (start screen to candidate screen) and NO ARC (candidate to any screen) then end point screen. If the second premise of Rule 3 is satisfied, then the candidate screen is an end point screen, the end point screen title and selection number are stored in a list and another candidate screen is selected using Rules 1 and 2 with Screen A unchanged. If the second premise of Rule 3 is not satisfied, then the candidate screen is not an end point screen, and Rules 1 and 2 are again analyzed with Screen A being set now to the previous candidate. The foregoing process is then repeated until all candidates are tested and all end point screens are identified and stored in the list.

If Full test was selected, then Rules 1 and 2 are applied and described above for each end point screen in the list, Screen A being set to the starting screen and Screen B being set to the end point screen. The result is a path map from the starting screen to each end point screen. However, if the Random test was selected, then pseudo-random number generator 113 and the selected intensity factor percentage are used to select only some of the end point screens. Then Rules 1 and 2 are applied for each of the selected end point screens to determine the path map from the starting screen to each of the selected end point screens.

Figure 8:
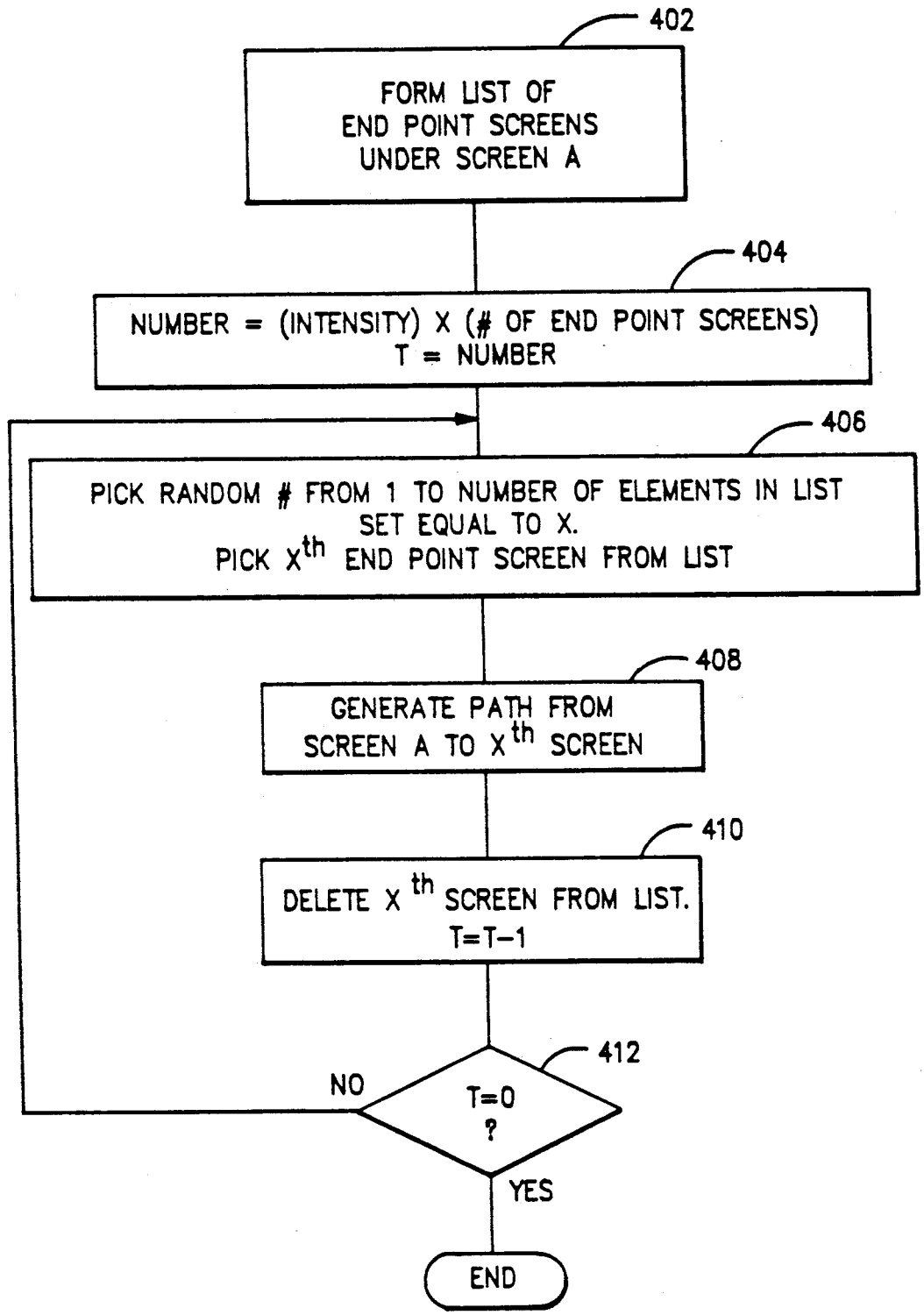
FIG. 8 is a flowchart illustrating an optional subroutine executed by the test program to pseudo-randomly test paths emanating from a menu screen.

If the "fixed" or "full" options were selected in screen 130 (FIG. 6), this procedure is repeated for each end screen in the list of end screens under Screen A. However, if the "random" option was selected in screen 130, then this procedure is utilized for a pseudo-random fraction of the paths emanating from the one selected starting screen. FIG. 8 illustrates the process implemented by generator 106 to pseudo-randomly select the paths for testing. In step 402, generator 106 makes a list of all end point screens in all paths emanating from the one selected screen. Generator 106 also assigns a sequential number to each end point screen. Then, generator 106 determines the number (number) of paths which should be tested based on the intensity selected in step 132 (FIG. 6) times the number of end point screens (step 404). Generator 106 also sets a variable "T" equal to this number (number). Next, generator 106 obtains a random number between one and the number of end point screens in the list using pseudo-random number generator 113, and selects this number (xth) end point screen from the list (step 406). Then generator 106 generates the path from Screen A to Screen X (step 408). Then, generator 106 deletes screen X from the list, decrements the number of screens in the list, and decrements the variable "T" (step 410). Steps 406, 408 and 410 are repeated for the remaining screens until T=0 (decision block 412). The foregoing is a description of how test system 100 checks paths from one screen to another and verifies that the screens in the paths are properly accessed by service processor 12.

Later, test program 107 determines if each or samples of the screens in the path between the two selected screens or emanating from the one selected screen identified by the knowledge base are actually generated by service processor 12 in the same hierarchical arrangement. To this end, the test program transmits a command (keystroke letters) to service processor 12 via interface 72 to power-up service processor 12 and then the keystroke letters to advance to Screen A or the starting screen in the branch. Then the program transmits the keystroke code via interface 72 to call up the next screen in the path. Then the test program determines if the screen matches the title in the Panel Definition. For example, if Screen A corresponds to Sign-on screen 30, and the next screen in the path according to the knowledge base is the Development Debug screen 32, test program 107 transmits the code for a keystroke "D" to service processor as follows:

CALL_KEYS ("D").

Next, test program 107 transmits to the service processor 12 the code to compare the actual screen title to "Development Debug":

CALL_LOOK_FOR (PANEL "DEVELOPMENT DEBUG").

In response, service processor 12 will compare the title in the screen that was actually called up to the title "Development Debug" and if they match, transmit a return code of zero to test program 107.

The following is a description of how the test program exercises end point screens such as by writing into a memory screen via the service processor 12 and then comparing what was actually written to what was intended to be written. If the Full option was selected from the user interface, then all of the end point screens in the list and all of the fields in each screen are exercised. If the Random option was selected, then end point screens in the list are pseudo-randomly selected by generator 113 for testing. Also, the fields in each of the selected screens are pseudo-randomly selected by generator 113 for testing. If the Fixed option was selected, then the user has specified which end point screens should be tested. All of the fields in each of the specified end point screens are tested.

The interpretative rules are used to make the test. Test program 107 transmits to service processor 12 keystroke codes via interface 72 to (1) call up a memory screen, (2) move the cursor to the proper data entry position or field, and then (3) write data into memory as follows:

1. (a) CALL_KEYS (KEYSTROKE LETTER). (b) CALL_KEYS (KEYSTROKE LETTER).
2. CUR_MOVE (ROW X, COLUMN Y).
3. CALL_KEYS (DATA).

These commands direct service processor 12 to write the specified data into the field indicated by the position of the cursor.

Then, test program 107 directs service processor 12 to read the contents of the memory location indicated by the position of the cursor and compare the data in the memory location indicated by the cursor to the data stated in the command, using the following command:

CALL_LOOK_FOR (DATA).

In response to this command, a return code will be sent to test program 107 indicating whether service processor 12 perceives that the specified data has been written into the proper location.

Figure 9:
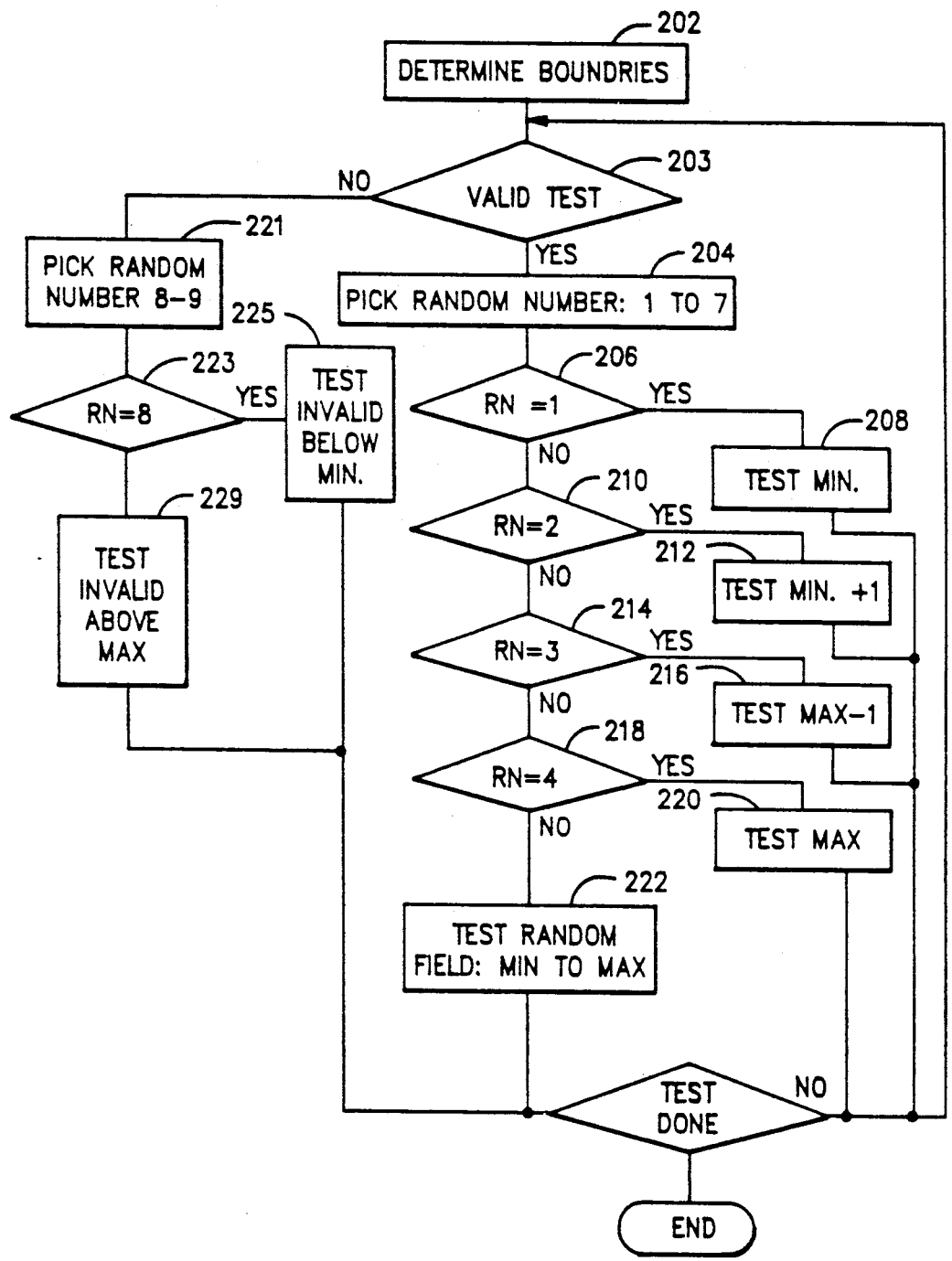
FIG. 9 is a flowchart illustrating a subroutine executed by the test program generation system of FIG. 4 to pseudo-randomly test fields within end point screens yet increase the degree of testing of boundary values of the fields.

As described in more detail below, test program generator 106 can write a test program which tests all fields in a memory screen if requested by a user. However, test program generator 106 can also test a fraction less than one of the memory fields within the memory screen in the manner illustrated in FIG. 9. Such a fractional approach to the testing reduces the overall testing time. FIG. 9 also illustrates the manner in which test program generator 106 emphasizes the testing of the boundaries of both address and data fields.

In step 202, test program generator 106 determines the lower and upper boundaries of the field. If the Valid Test was selected from User Interface 103 (decision block 203), test program generator 106 selects a random number in the range one to seven using pseudo-random number generator 113 (step 204). If the random number equals one (decision block 206), then generator 106 tests the lower boundary or minimum value in the range (step 208). In the example illustrated above where the "VAR" field was described by rules 1-4, the minimum value is 0000. If the random number selected in step 204 was equal to two instead of one (decision block 210), then generator 106 would test the minimum value plus one (step 212). In the example illustrated above for the "VAR" field, this value equals 0001. If the random number selected in step 204 equaled three (decision block 214), then generator 106 would test the maximum value or upper boundary minus one (step 216), FFFE. However, if the random number selected in step 204 equaled four (decision block 218), then generator 106 would test the maximum value in the field or the upper limit (step 220). In the example illustrated above for the "VAR" field, this maximum value equals FFFF. However, if the random number selected in step 204 was between five and seven, generator 106 would select a pseudo random field between the minimum and maximum value using pseudo-random number generator 113 (step 222), which in the above example would be between 0000 and FFFF.

As indicated above, in approximately four cases out of seven cases, a boundary condition is tested. This emphasis on testing the boundary conditions is made because a large percentage of problems occur at the boundary locations compared to the errors that occur between the boundaries. In the illustrated example, approximately four tests out of seven are made on the boundary conditions. However, if desired a different percentage of boundary conditions can be tested by simply changing the range of random numbers generated in step 204. If the range were increased, then a lower percentage of tests would be run at the boundary conditions, and vice versa. Also, FIG. 8 illustrates in step 222 that the test between the boundary conditions is made on a random or pseudo random basis.

FIG. 9 also illustrates that the Test Program can also do "invalid" testing (decision block 203) if this test was selected via user interface 103. In such a case, of a random number (step 221) equals eight, then a data entry less than the minimum value in the range is attempted (decision block 223 and step 225). If the random number equals nine, then a data entry greater than the maximum value in the range is attempted (step 229).

The Interpretative rules are also used to test the ability of service processor 12 to allocate memory for a particular application. To make this test, test program 107 transmits keystroke codes via interface 72 to call-up a memory allocation screen, move the cursor to the proper data entry position and then allocate the memory as follows:

CALL_KEYS (KEYSTROKE LETTER).
CUR_MOVE (ROW X, COLUMN Y).
CALL_KEYS (12 MEG).

This command directs service processor 12 to allocate 12 Megabytes of memory 22 for an application. Then, test program 107 asks service processor 12 to check how much memory was actually allocated by transmitting the following command:

CALL_LOOK_FOR (MACHINE NOW HAS 12 MEG).

In response, service processor 12 compares the data in the memory allocation position indicated by the cursor to the requested allocation, and a return code is sent to test program 107 indicating whether service processor 12 perceives that the proper amount of memory has been allocated. This is another test of the ability of service processor 12 to accurately write into the memory and accurately read therefrom.

Test program generator 106 also includes rules to test that CPU 16 has been powered up after the service processor 12 attempts to power the processor up. To make this test, test program 107 transmits the power up code to service processor 12, transmits a code to move the cursor into position, and then asks the service processor to compare the information at that position to what is expected.

CALL_KEYS (KEYSTROKE LETTER).
CUR_MOVE (ROW X, COLUMN Y).
CALL_KEYS (DATA).
CALL_LOOK_FOR (DATA).

Test program generator 106 also includes Syntax rules 112 illustrated in FIG. 5. The Syntax rules allow the test program generator to generate codes in other formats for other types of service processors and interfaces.

Based on the foregoing, an automatic tester for a service processor has been disclosed. However, numerous modifications and substitutions may be made without deviating from the scope of the invention. For example, the service processor can test other functions and controls of system 10, and tester 100 can be used to test these other functions and controls provided by the service processor. Also, system 100 is usable with service processors and other types of application which display screens other than those illustrated in FIG. 2. Therefore, the invention has been disclosed by way of illustration and not limitation, and reference should be made to the following claims to determine the scope of the invention.

We claim:

1. Apparatus for testing a service processor associated with and coupled to a computer, said computer including a hierarchical arrangement of actual screens in storage for display by said service processor, said apparatus comprising:
   storage means for storing a map indicating a correct hierarchical order of screens; and
   program generating means, coupled to said storage means, for generating a program to (a) direct said service processor to display said actual screens in a hierarchical order reflecting said hierarchical arrangement of actual screens in said storage of said computer and (b) compare the map provided by said storage means to the hierarchical order of actual screens displayed by said service processor to determine if said service processor displays the correct hierarchical order of actual screens.

2. Apparatus as set forth in claim 1 further comprising user interface means for selecting at least one screen displayed by said service processor to identify a group of actual screens within a lower section of the hierarchy; and wherein said program generating means is coupled to said user interface means and generates a program to compare the hierarchical order of the screens of said group to a corresponding section of said map.

3. Apparatus as set forth in claim 2 wherein said program generating means includes means for identifying a path, based on the map within said storage means, between two screens selected via said user interface means.

4. Apparatus as set forth in claim 2 wherein said group is a branch of actual screens in the hierarchy, and the selected screen identifies a top screen in the branch.

5. Apparatus as set forth in claim 1 wherein
   said actual screens comprise menu screens and end point screens, said end point screens representing an actual memory of the computer serviced by said service processor; and
   said program generating means includes means for selecting some but not all of memory fields within the end point screens, and generating a program to exercise the selected fields to test the ability of said service processor to write into said fields in said actual memory in said computer and read from said fields.

6. Apparatus as set forth in claim 5 wherein the selected fields of said end point screens are selected at least in part randomly; and
   further comprising user interface means for specifying the fraction of fields for testing.

7. Apparatus as set forth in claim 5 wherein said program generating means includes means for generating a program to exercise a greater fraction of memory boundary fields than memory fields between said memory boundary fields.

8. Apparatus as set forth in claim 1 wherein:
   said map includes a name and relative position of each screen to indicate the correct hierarchical order; and
   said program compares the map to the hierarchical order of actual screens displayed by said service processor by comparing said name and relative position of each screen in said map to a name within the displayed actual screen having the corresponding position in the hierarchy of actual screens.

9. Apparatus as set forth in claim 8 wherein
   said program generating means includes means for generating a program to compare the hierarchical order of some but not all of said actual screens to said map.

10. Apparatus as set forth in claim 9 further comprising user interface means for specifying a fraction of paths through the hierarchy of actual screens for comparison to paths defined by said map.

11. Apparatus as set forth in claim 9 further comprising
    means, coupled to said program generating means, for automatically directing said program generating means to generate additional programs to compare the hierarchical order of different actual screens to the map; and
    means for executing said additional programs continuously after the first said program is executed until either a manual shut-off or a timed shut off.

12. Apparatus as set forth in claim 1 wherein said program generating means includes means for writing a program to test the ability of said service processor to allocate memory in said computer.

13. Apparatus for testing a service processor associated with and coupled to a computer, said computer including a hierarchical arrangement of actual screens in storage for display by said service processor, said actual screens comprising end point screens and menu screens, said menu screens accessing each other and said end point screens, said end point screens being the lowest screens in any branch of the hierarchy, said apparatus comprising: storage means for storing a map indicating said hierarchical arrangement of actual screens; and
    program generating means, coupled to said storage means, for identifying said end point screens in said hierarchy by following said map from a top or intermediary menu screen downwardly to said end point screens, and generating a program to display said end point screens, write data into locations in said computer corresponding to said displayed end point screens, read data from said locations, and comparing the written data to the read data to determine if said service processor is working properly.

14. Apparatus as set forth in claim 13 further comprising user interface means for selecting any of said menu screens to identify a branch of menu and end point screens which stem downwardly from the selected menu screen in said hierarchy; and wherein said program generating means is coupled to said user interface means to generate a program to exercise the end point screens of said branch.

15. Apparatus as set forth in claim 14 wherein
    said program generating means includes means for selecting a fraction less than one of said end point screens of said branch for testing.

16. Apparatus as set forth in claim 15 wherein said screens, whose hierarchical order is compared to said map, are selected pseudo randomly.

17. Apparatus as set forth in claim 13 wherein
said end point screens represent memory of the computer serviced by said service processor; and
said program generating means includes means for selecting a fraction less than one of memory fields within said end point screens, and generating a program to exercise the selected fields to test the ability of said service processor to write into said fields in actual memory in said computer and read from said fields.

* * * * *